(12) United States Patent
Cui et al.

(10) Patent No.: US 12,141,180 B2
(45) Date of Patent: Nov. 12, 2024

(54) METHODS FOR IDENTIFYING PRODUCT VARIANTS

(71) Applicant: Home Depot Product Authority, LLC, Atlanta, GA (US)

(72) Inventors: Xiquan Cui, Atlanta, GA (US); Rebecca West, Atlanta, GA (US); Khalifeh Al Jadda, Atlanta, GA (US); Huiming Qu, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 284 days.

(21) Appl. No.: 17/234,033

(22) Filed: Apr. 19, 2021

(65) Prior Publication Data

US 2021/0326370 A1 Oct. 21, 2021

Related U.S. Application Data

(60) Provisional application No. 63/012,608, filed on Apr. 20, 2020.

(51) Int. Cl.
*G06F 16/31* (2019.01)
*G06F 16/33* (2019.01)
(Continued)

(52) U.S. Cl.
CPC ........ *G06F 16/3344* (2019.01); *G06F 16/313* (2019.01); *G06F 16/383* (2019.01); *G06F 16/9035* (2019.01); *G06F 16/908* (2019.01); *G06F 16/954* (2019.01); *G06Q 30/0627* (2013.01); *G06Q 30/0629* (2013.01)

(58) Field of Classification Search
CPC .... G06F 16/313; G06F 16/383; G06F 16/954; G06F 16/3344; G06F 16/9035; G06F 16/908; G06Q 30/0627; G06Q 30/0629
See application file for complete search history.

(56) References Cited

U.S. PATENT DOCUMENTS 7,805,337 B1 9/2010 Ogg
7,885,838 B2 2/2011 Sobalvarro et al.
(Continued)

OTHER PUBLICATIONS

Saleh Rehiel Alenazi and Kamsuriah Ahmad. 2016. Record duplication detection in database: A review. International Journal on Advanced Science, Engineering and Information Technology 6, 6 (2016), 838-845.
(Continued)

*Primary Examiner* — Marc S Somers
(74) *Attorney, Agent, or Firm* — Greenberg Traurig, LLP

(57) ABSTRACT

A computer-implemented method includes extracting, by one or more processors of one or more computing devices, a product family name from each of a plurality of unstructured product titles associated with a plurality of products. The method further includes determining, by the one or more processors, a degree of similarity between model numbers of the plurality of products. The method further includes determining, by the one or more processors, that at least two of the plurality of products are variants of one another by determining that the at least two of the plurality of products have a same extracted product family name and determining that the degree of similarity between the model numbers of the plurality of products is above a predetermined threshold.

21 Claims, 8 Drawing Sheets

(51) Int. Cl.
　　　G06F 16/383　　(2019.01)
　　　G06F 16/9035　(2019.01)
　　　G06F 16/908　　(2019.01)
　　　G06F 16/954　　(2019.01)
　　　G06Q 30/0601　(2023.01)

(56) References Cited

U.S. PATENT DOCUMENTS

| | | | |
|---|---|---|---|
| 8,655,737 | B1 | 2/2014 | Tromble |
| 8,738,643 | B1* | 5/2014 | Czuba .................. G06F 16/951 707/730 |
| 9,177,059 | B2 | 11/2015 | Musgrove et al. |
| 9,436,704 | B2 | 9/2016 | Gershon et al. |
| 9,811,851 | B2 | 11/2017 | Fox et al. |
| 10,210,554 | B2 | 2/2019 | Linevsky et al. |
| 10,262,356 | B2 | 4/2019 | Davis et al. |
| 2004/0080530 | A1* | 4/2004 | Lee ......................... G06F 3/147 715/738 |
| 2007/0239710 | A1* | 10/2007 | Jing ...................... G06F 16/951 |
| 2011/0184806 | A1 | 7/2011 | Chen et al. |
| 2013/0060662 | A1 | 3/2013 | Carlson et al. |
| 2013/0103389 | A1 | 4/2013 | Gattani et al. |
| 2013/0159209 | A1* | 6/2013 | Zhao ..................... G06Q 30/02 705/348 |
| 2014/0019307 | A1 | 1/2014 | Guardalben |
| 2014/0189002 | A1* | 7/2014 | Orioli .................. H04L 51/046 709/204 |
| 2014/0222503 | A1 | 8/2014 | Vijayaraghavan et al. |
| 2015/0262117 | A1 | 9/2015 | Li |
| 2016/0078398 | A1 | 3/2016 | Lu |
| 2016/0232591 | A1 | 8/2016 | Hu et al. |
| 2017/0109767 | A1* | 4/2017 | Shpanya ............... G06Q 30/06 705/26.61 |
| 2017/0345075 | A1* | 11/2017 | Khandelwal ......... G06V 30/414 |
| 2018/0047071 | A1* | 2/2018 | Hsu ..................... G06Q 30/0282 |
| 2018/0130072 | A1 | 5/2018 | Ouimet et al. |
| 2018/0302682 | A1* | 10/2018 | Saxena .............. H04N 21/4722 |
| 2021/0103971 | A1* | 4/2021 | Fox ......................... G06N 5/04 |

OTHER PUBLICATIONS

Marnix de Bakker, Flavius Frasincar, and Damir Vandic. 2013. A hybrid model words-driven approach for web product duplicate detection. In International Conference on Advanced Information Systems Engineering. Springer, 149-161.

Sariel Har-Peled, Piotr Indyk, and Rajeev Motwani. 2012. Approximate nearest neighbor: Towards removing the curse of dimensionality. Theory of computing 8, 1 (2012), 321-350.

Aron Hartveld, Max van Keulen, Diederik Mathol, Thomas van Noort, Thomas Plaatsman, Flavius Frasincar, and Kim Schouten. 2018. An LSH-Based Model-Words-Driven Product Duplicate Detection Method. In International Conference on Advanced Information Systems Engineering. Springer, 409-423.

Roya Hassanian-esfahani and Mohammad-javad Kargar. 2019. A pruning strategy to improve pairwise comparison-based near-duplicate detection. Knowledge and Information Systems (2019), 1-33.

Vladimir I Levenshtein. [n.d.]. Binary codes capable of correcting deletions, insertions, and reversals, 4 pgs. 1966.

Ryan Maunu. 2018. The Duplicate Review Tool: Incorporating Visual Search into Merchandising Operations. Retrieved Dec. 10, 2019 from https://tech.wayfair.com/data-science/2018/05/the-duplicate-review-tool-incorporating-visual-search-into-merchandising-operations/, 8 pgs.

Oliver Strauß, Ahmad Almheidat, and Holger Kett. 2019. Applying Heuristic and Machine Learning Strategies to ProductResolution. In Proceedings of the 15th International Conference on Web Information Systems and Technologies (WEBIST 2019). 242-249.

Anthony KH Tung, Jiawei Han, Laks VS Lakshmanan, and Raymond T Ng. 2001. Constraint-based clustering in large databases. In International Conference on Database Theory. Springer, 405-419.

Ronald van Bezu, Sjoerd Borst, Rick Rijkse, Jim Verhagen, Damir Vandic, and Flavius Frasincar. 2015. Multi-component similarity method for web product duplicate detection. In Proceedings of the 30th annual ACM symposium on applied computing. ACM, 761-768.

Iris Van Dam, Gerhard van Ginkel, Wim Kuipers, Nikki Nijenhuis, Damir Vandic, and Flavius Frasincar. 2016. Duplicate detection in web shops using LSH to reduce the number of computations. In Proceedings of the 31st Annual ACM Symposium on Applied Computing. ACM, 772-779.

Damir Vandic, Jan-Willem Van Dam, and Flavius Frasincar. 2012. Faceted product search powered by the Semantic Web. Decision Support Systems 53, 3 (2012), 425-437.

ISA/US, ISR/WO issued in PCT/US2021/028121, dated Jul. 14, 2021, 9 pgs.

\* cited by examiner

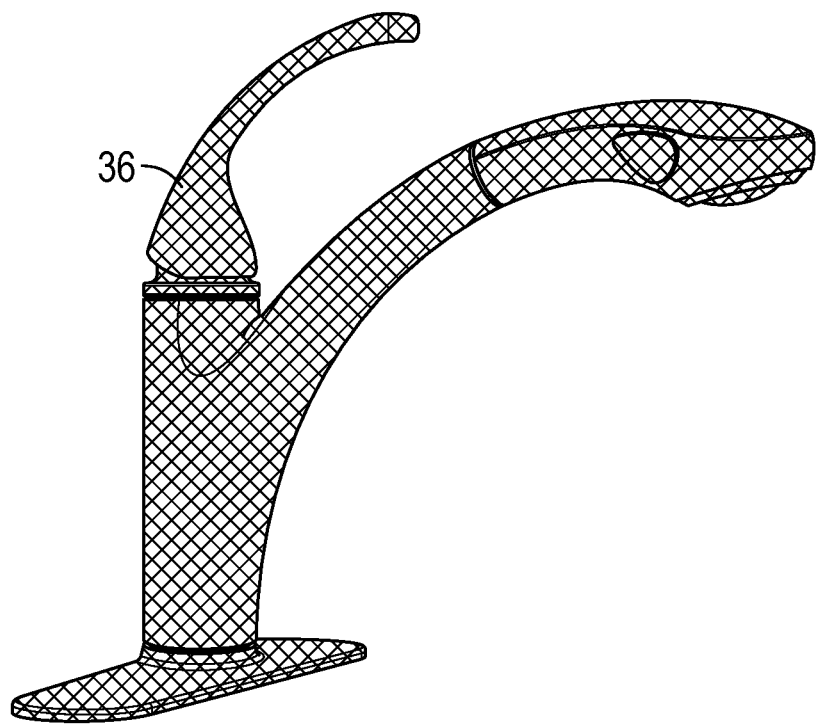
Color/Finish: Vibrant Brushed Nickel
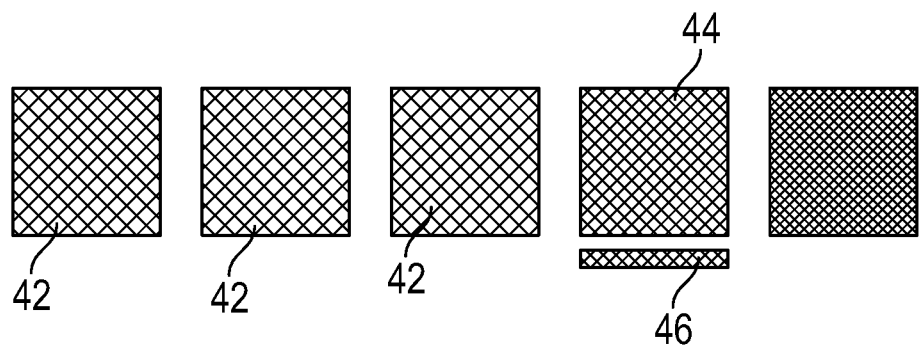
FIG.4

METHODS FOR IDENTIFYING PRODUCT VARIANTS

CROSS REFERENCE TO RELATED APPLICATION

This application claims priority to and the benefit of U.S. Provisional Appln. No. 63/012,608, filed on Apr. 20, 2020, the disclosure of which is incorporated herein by reference in its entirety.

BACKGROUND

Both a retailer and its customers can benefit from the retailer providing easy to use interfaces for shopping online. The retailer may provide various webpages of a website on which products may be viewed, purchased, etc. Providing product webpages that demonstrate all variants of a product (e.g., products that come in different colors) is helpful so that the customer does not have to navigate to multiple webpages to view those different variants.

SUMMARY

An illustrative computer-implemented method includes extracting, by one or more processors of one or more computing devices, a product family name from each of a plurality of unstructured product titles associated with a plurality of products. The method further includes determining, by the one or more processors, a degree of similarity between model numbers of the plurality of products. The method further includes determining, by the one or more processors, that at least two of the plurality of products are variants of one another by determining that the at least two of the plurality of products have a same extracted product family name and determining that the degree of similarity between the model numbers of the plurality of products is above a predetermined threshold.

An illustrative non-transitory computer-readable medium has computer executable instructions stored thereon that, upon execution by a processing device, cause the processing device to perform operations. The operations include extracting a product family name from each of a plurality of unstructured product titles associated with a plurality of products. The operations further include determining a degree of similarity between model numbers of the plurality of products. The operations further include determining that at least two of the plurality of products are variants of one another by determining that the at least two of the plurality of products have a same extracted product family name and determining that the degree of similarity between the model numbers of the plurality of products is above a predetermined threshold.

BRIEF DESCRIPTION OF THE DRAWINGS

FIG. 4 illustrates an example of a portion of a display of a webpage for displaying product variant information to a user, in embodiments.

DETAILED DESCRIPTION

Figures 1, 2:
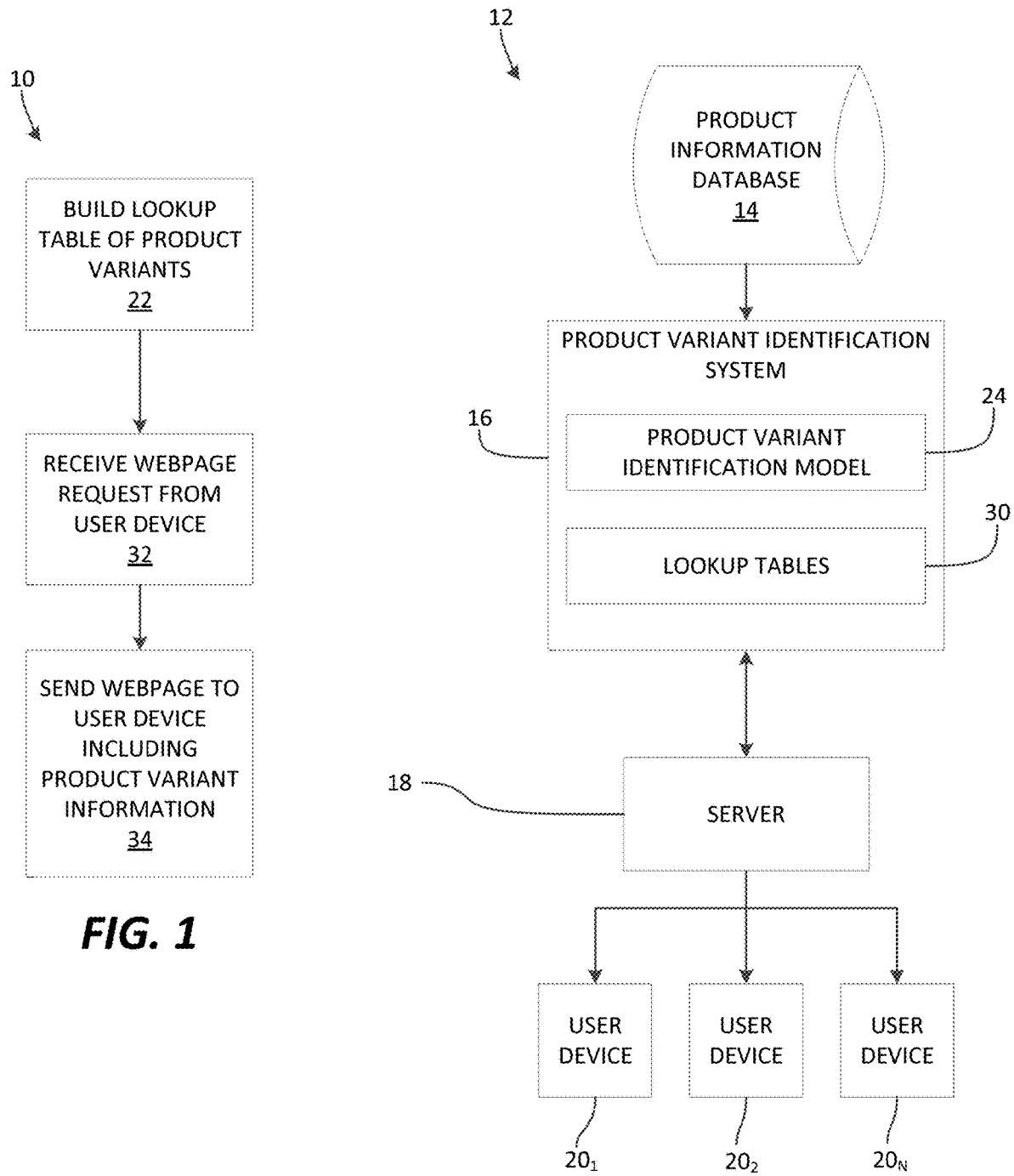
FIG. 1 is a flow chart illustrating an example method of presenting a webpage with product variant information to a user, in embodiments.
FIG. 2 is a block diagram view of an example system for identifying product variants, in embodiments.

Consumers often use e-commerce websites to shop for products and services. Consumers, in using e-commerce websites, may view different webpages of an e-commerce website to look at different products, purchase products, search for products, etc. If a consumer does not find what they are looking for, the consumer may navigate to a different e-commerce website to look for a desired product. Thus, it is desirable for an e-commerce retailer to build and maintain a website that is easy to use and enables a consumer to efficiently and quickly locate a desired product.

In order to build and maintain a useful and efficient website, an e-commerce retailer may keep and maintain a product information database that includes information about the products offered for sale by the retailer. Product pages of the website may be built using the information in the product information database. However, e-commerce retailers may face problems in building a website due to disparate, incomplete, or otherwise varying product information received from different product manufacturers, distributors, etc. about the products offered by the retailer. Thus, for e-commerce retailers with a large product selection, organizing and grouping products in meaningful ways is important for creating positive customer shopping experiences and cultivating an authoritative brand image.

An important type of product groupings for an e-commerce website is to identify a family of product variants, where the product variants are mostly the same with slight and yet distinct differences (e.g., color, finish, pack size, color, product size, material type, weight). Described herein are various embodiments for identifying product variants that may be grouped together for efficient and meaningful display on a website.

As a non-limiting example, product family names may be extracted from unstructured (e.g., plain text) product titles and products with similar model numbers may be determined to identify product variants. The embodiments described herein may be used on a wide range of product categories (e.g. appliances, decor, tools, and building materials, etc.), and the results may be used to build product family webpages so that all products that are product variants of a particular product family may be easily viewed on a single webpage. For example, different colors of a similar product may be viewed on a same webpage, so that a customer can easily see the different color options for a product without navigating to separate webpages.

When a retailer has a large product catalog, the embodiments described herein for automating the identification of product variants can yield an improved customer experience and improved sales and brand loyalty for the retailer. In particular, by providing webpages that accurately display product variants and provide for those variants to be selected, viewed, purchased, etc., the experience of the user may be improved at least because (1) the user does not have to enter multiple search queries to find different variants, (2) the user does not have to look for product variants from another retailer, (3) the user does not have to click through multiple webpages to find different product variants, and (4) the user is made aware of all of a product's variants rather than only locating a subset of a product's variants on a retailer website. Providing product variants on a single webpage may also reduce the load on a retailer's servers by decreasing the number of searches performed by a user and subsequent webpages accessed and loaded by a user to find desired product variants. A user is also more likely to actually buy a product if they are able to easily navigate to a desired product, and is more likely to buy a product if they believe they have a good understanding of all product variants available for a desired product. In addition, a user is more likely to buy products from the retailer again (e.g., be a repeat customer) if they have had a positive buying experience in the past (e.g., because product variants were easy to locate and view on a retailers website).

Providing product variants together on a webpage according to the present disclosure may allow a user to more quickly find, view, and/or purchase an item they desire through an electronic interface, such as a website. In various embodiments, the interface may show product variants of a product family on a single webpage. In various embodiments, graphical control elements may also be provided on an interface that enable the user to select and purchase a product displayed as part of a product family. This may improve the user experience by reducing user time and effort on a website to find a desired product or other item.

As a result, automated identification of product variants according to the techniques of the present disclosure solves an internet-centric problem—how to accurately determine and display product variants on a website in an efficient manner—through methods and systems necessarily rooted in computer technology. Additionally, the techniques described herein improve the functionality of a website accessed by a user. For example, a database or lookup table may be built using the product variants identified according to the techniques described herein before a user accesses the website and begins to search for products. The webpages associated with particular product families that display each variant of a product may also be built before a user accesses the website and begins searching for products. Because the database or lookup table of product variants is already established and/or the webpages displaying product variants are already built, a server may be able to quickly send and display to a user a webpage with product variants, resulting in faster and smoother website operation relative to determining product variant information dynamically (e.g., on-demand in response to a user requesting access to a particular product webpage). Similarly, since the products that are variants of one another may also be looked up in the database or lookup table quickly and easily, the product variant information may also be used for any other purpose or by any other electronic device or user than just a by a customer of an e-commerce website.

In addition, the methods and systems described herein may provide an improved graphical user interface (GUI). Displaying more relevant product variant information to a user is a demonstrable improvement that allows a user to quickly and easily select, unselect, add to a cart, purchase, view, and otherwise interact with desired products or other items on an interface, such as a webpage. In other words, the methods and systems herein provide for a particular manner of summarizing and presenting information by and on electronic devices, and include specific manners of displaying a limited set of relevant information to a user, rather than using conventional methods for determining product variants that may display less relevant or less accurate product variant information on a computer. In particular, the improved interfaces described herein prevent a user from having to perform multiple searches for product variants and/or having to view product variants on more than one interface or webpage. This allows a user to see the most relevant data quickly, and saves the user from the time and hassle of navigating through multiple interfaces and webpages.

Although embodiments herein are described with respect to identifying product variants for an e-commerce website, the methods and systems described herein are not so limited. For example, the methods and systems described herein may be used to organize the layout of a brick and mortar retail store, as properly determining product variants can be useful for the design of a retail store. For example, when designing shelving for or placement of product within a brick and mortar retail store, it may be valuable for such planning to know how many variants of a product there are so that those products can be displayed together. The identification of product variants may also be helpful for inventory management. For example, determining when to run a sale for a particular product, how much products should be discounted in a sale, or determining which products to run a sale for may benefit from the use or knowledge of product variant information. For example, a retailer may want to run a sale for all variants (e.g., colors) of a product family. Without the product variant information that may be determined using the embodiments described herein, it may be difficult to manually identify all product variants for implementing a sale and/or an accompanying advertising campaign. Similarly, orders for new inventory may be adjusted based on how many other variants of a product are still in inventory. In another example, the embodiments described herein may be applied to determining variants for something other than tangible products. For example, the embodiments herein may be applied to any type of product or service that may have variants. For example, home improvement contracting services may include certain offerings that are variants of one another. Intangible products such as software may also have variants that may be sold. Accordingly, any type of product or service that has offerings that are variants of one another may benefit from automated identification of product variants as described herein (e.g., when that product or service has a product title or its equivalent, when that product or service has a model number or its equivalent).

Figure 6:
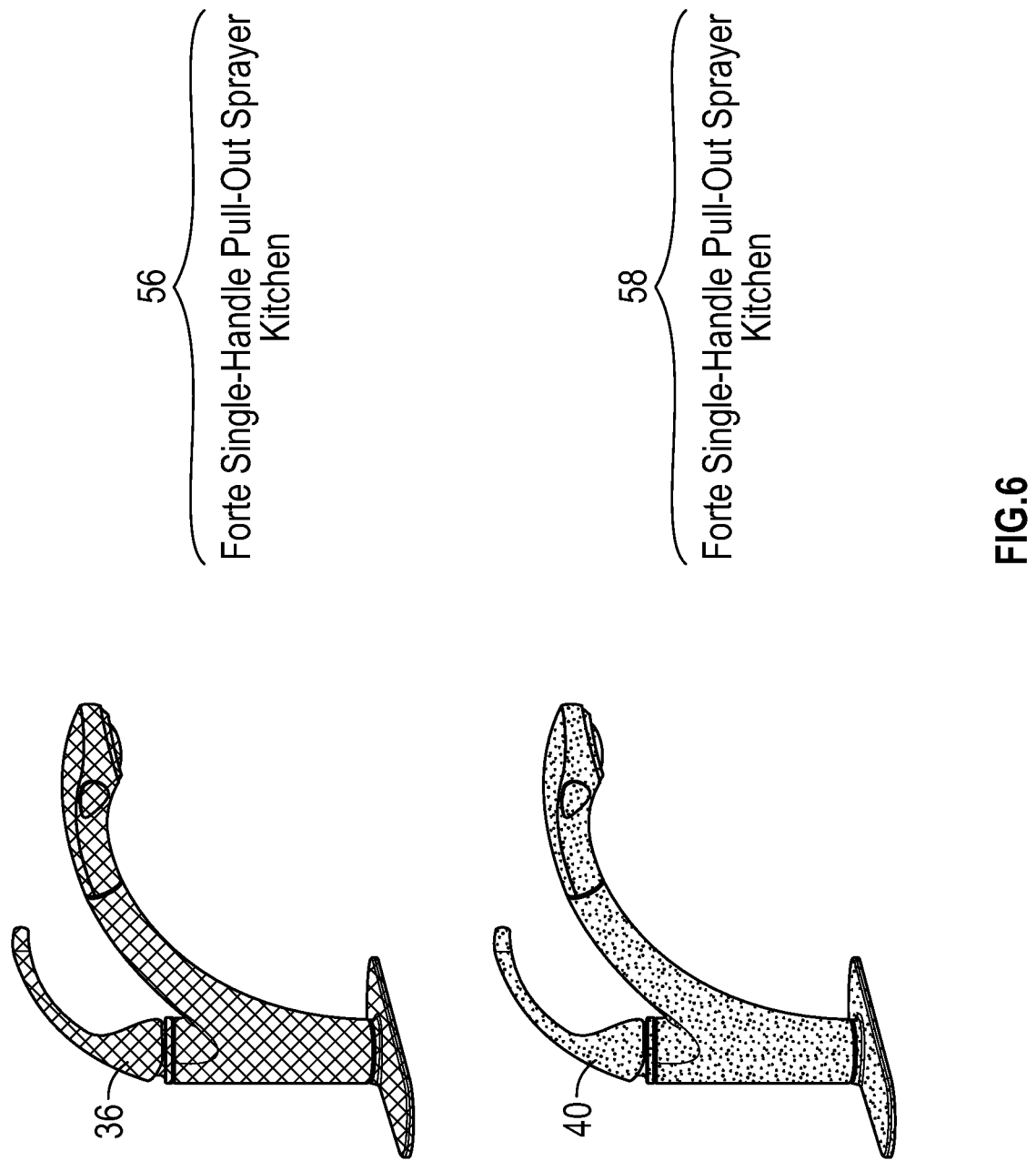
FIG. 6 illustrates the two example products of FIGS. 3A and 3C along with their product family names extracted from unstructured product titles, in embodiments.
Figure 7:
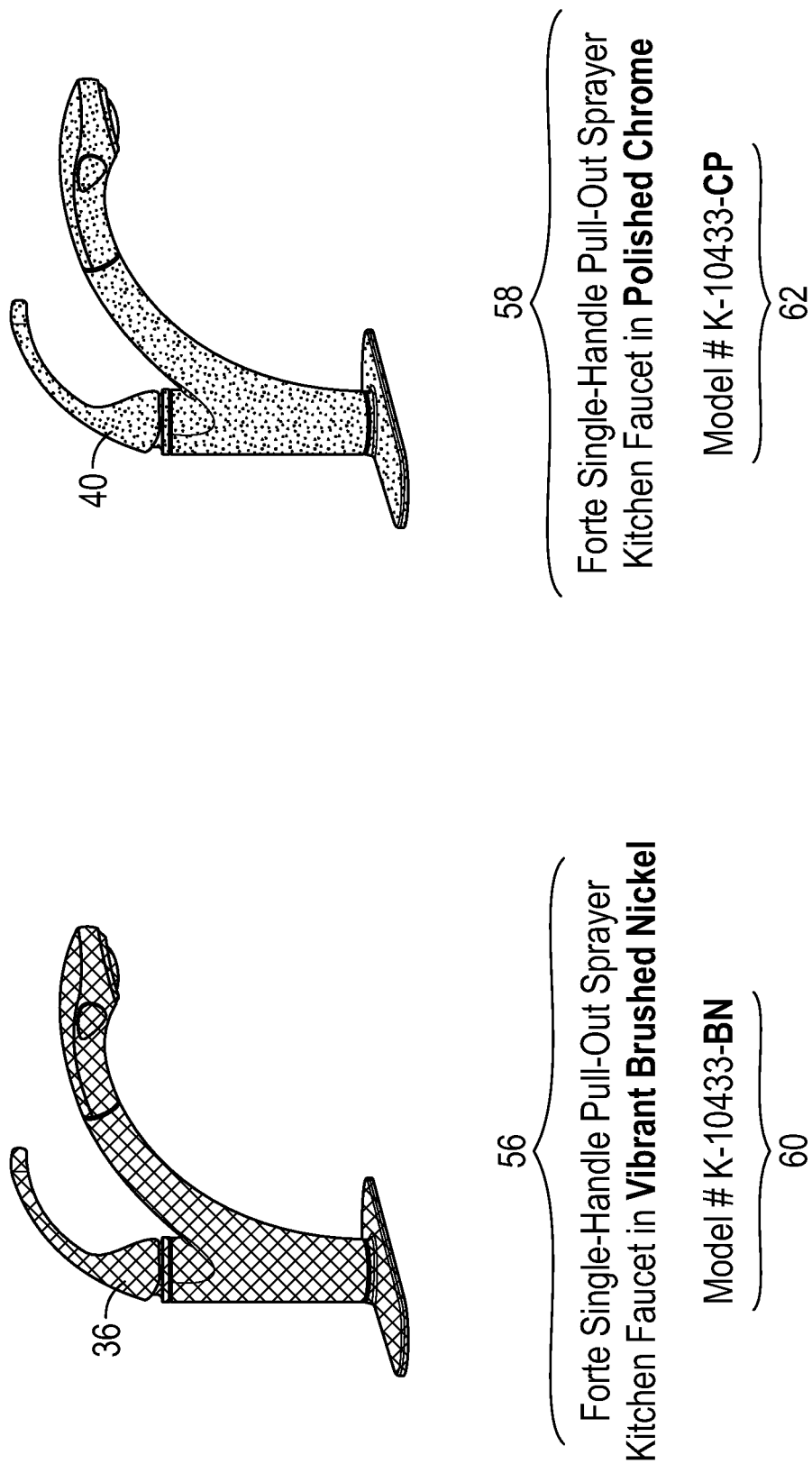
FIG. 7 illustrates the two example products of FIGS. 3A and 3C showing the differences between their unstructured product titles and model numbers, in embodiments.

First, with respect to FIGS. 1 and 2, an illustrative method and illustrative system for automatically presenting a webpage with product variant information to a user and identifying product variants will be described at a high level. With respect to FIGS. 3A-3C, three illustrative products that are variants of one another will be described. With respect to FIG. 4, an illustrative portion of a display of a webpage for displaying product variant information to a user will be described. With respect to FIG. 5, an illustrative method for identifying product variants will be described. With respect to FIG. 6, illustrative product family names extracted from unstructured product titles will be described. With respect to FIG. 7, illustrative unstructured product title and model number differences will be described. With respect to FIG. 8, an illustrative table demonstrating a correlation between edit distance of model numbers of an example product set and whether those products are variants of one another will be described. Finally, with respect to FIG. 9, an illustrative computing environment that may be used in conjunction with the methods and processes of this disclosure will be described.

Referring to the drawings, in which like numerals refer to the same or similar features in the various views, FIG. 1 is a flow chart of an illustrative method 10 for presenting a webpage with product variant information to a user. FIG. 2 is a block diagram of an illustrative system 12 for identifying product variants and providing presenting a webpage with product variant information to a user. The method 10 of FIG. 1 and the system 12 of FIG. 2 are described in conjunction below.

Generally, the method 10 may include building a lookup table or database of product variants and using that lookup table or database to determine query rewrites for user product queries to return more relevant search results to a user. In some instances, the lookup table or database may be product variant specific, or product variant information may be added to or otherwise used to supplement a lookup table or database with additional information. In addition, as products offered by a retailer change, a lookup table or database with product variant information may be updated with new product variant information, and product variant information for products no longer offered may be optionally removed from a lookup table or database. The system 12 generally includes computer hardware and functional capability for carrying out the method 10 and other methods and functions of this disclosure. The system 12 may include a product information database 14, a product variant identification system 16, and a server 18 in electronic communication with a plurality of user devices $20_1$, $20_2$, ... $20_N$, which may be referred to individually as a user device 20 or collectively as user devices 20. The system 12 may also perform other methods of this disclosure and may provide one or more electronic user interfaces and/or graphical presentations to the user. The system 12 may also host or otherwise provide one or more websites, mobile applications, and the like, in embodiments.

The method 10 will be described in terms of a user, such as a customer, interacting with a website. The server 18 may host or provide that website, and accordingly may receive input from the user through the website. The server 18 may exchange information with the product variant identification system 16 to carry out one or more steps of the method 10, in embodiments. In other embodiments, the server 18 and the product variant identification system 16 may be the same processing system or apparatus.

The method 10 may be performed, in part or in full, by a retailer, in embodiments. That is, the system 12 may be owned or operated by or on behalf of a retailer, in embodiments. The method 10 may also be carried out, in full or in part, by some other type of entity. A website having the features referenced herein may be the website of a retailer, and the brick-and-mortar stores referenced herein may be stores of the same retailer. Additionally or alternatively, a website having the features described herein and the brick-and-mortar stores may be associated with different entities. A website having the features described herein display webpages that include various products and/or services, including variants of those products and/or services, and the website may list and sell products and/or services sold by the retailer, in embodiments. Additionally or alternatively, such a website may list and sell items sold by third parties and may return search results related to those items using the query rewrite methods and systems described herein.

The method 10 may include a step 22 of building a lookup table of product variants using a product variant identification model 24. Such a lookup up table may cross-reference different potential user queries with one or more respective query rewrites per user query. An embodiment of the step 22 is illustrated in and will be described (as a method) in greater detail with respect to FIG. 5. With continued reference to FIGS. 1 and 2, the lookup table building step 22 may generally include the product variant identification model 24 using product information in the product information database 14 (e.g., product title, product model number) to build lookup tables 30. The lookup tables 30 may also be a database, in embodiments. The lookup tables 30 may also be incorporated into the product information database 14, in embodiments. The product variant identification model 24 may be used to build the lookup tables 30 so that product variants for a particular product family may be displayed to a user on a single webpage or as part of search results as described herein.

With continued reference to FIGS. 1 and 2, the method 10 may further include a step 32 of receiving a webpage request from a user device. The method 10 may further include a step 34 of sending the webpage to the user device, where the webpage includes product variant information. The webpage request may be received, for example, by the server 18 from a user device 20 through a website provided by the server 18 or through another electronic user interface such as a mobile application, in-store kiosk, etc. As noted above, the website may be, for example, an e-commerce site associated with or operated by or on behalf of a retailer. The webpage request may be, for example, a selection of a uniform resource identifier (URI) (e.g., a uniform resource locator (URL)) using an input device (e.g., touch screen, mouse) or a URI entered using an input device (e.g., keyboard, voice-to-text software, audio spoken to a digital assistant (e.g., Google Home™, Amazon Alexa™, Apple Siri™)). The webpage request may also be a search query performed by the user for a product and/or service, for example by entering a search string into a search field of a website using a a physical or digital keyboard or voice-to-text software, audio spoken to a digital assistant (e.g., Google Home™, Amazon Alexa™, Apple Siri™), etc.

In one embodiment, the electronic user interface with which the user interacts may be on a mobile application, and the mobile application may be configured to capture voice search requests from the user. The server 18 or user device 20 may be configured with voice recognition software to parse the user's voice search or voice request to select or navigate to a particular URI. In response to the voice search or voice requested URI, the server may send a webpage of search results related to the search or a webpage associated with a requested URI to the user through the electronic user interface of the user's mobile electronic device (e.g., user device 20).

The server 18, may use the lookup tables 30 of the product variant identification system 16 to determine product variants that should be part of the webpage sent to the user device 20. In various embodiments, product variants may be determined and stored in the lookup tables 30, the product information database 14, and/or as part of webpages built prior to receiving a request for a webpage from a user. Thus, the server 18 may send a webpage at the step 34 to a user device 20 based on previously identified product variant information. Where the webpage sent to the user device 20 is search results responsive to a user query, the server 18 may determine product variant information for multiple product families that are relevant to the user query from the lookup tables 30 and/or product information database 14. In this way, the webpage may be populated with product variant information of multiple product families that may be relevant to a user's search query.

The method 10 therefore advantageously provides more relevant information to a customer about product variants and enables the customers to find and select/purchase products with a reduced number of clicks. Instead of separately viewing several different product pages to view product variants of a same product family or viewing search results that are cluttered with multiple variants displayed as separate results for a search, the method 10 provides a quicker way for the customer to find a desired product by leveraging automated identification of product variants. Furthermore, the method 10 reduces the number of pages to which a user might navigate, thereby reducing server workload and improving server functionality.

The "user" noted in the method may be a customer that is shopping on a website provided by the server with a user device 20, in embodiments. The user device 20 may be a personal computer, user mobile computing device, or other computing device. Additionally or alternatively, the server 18 may provide all or part of an in-store checkout or informational environment or digital price display information, and the user devices 20 may be in-store kiosks or digital price displays.

Figure 3:
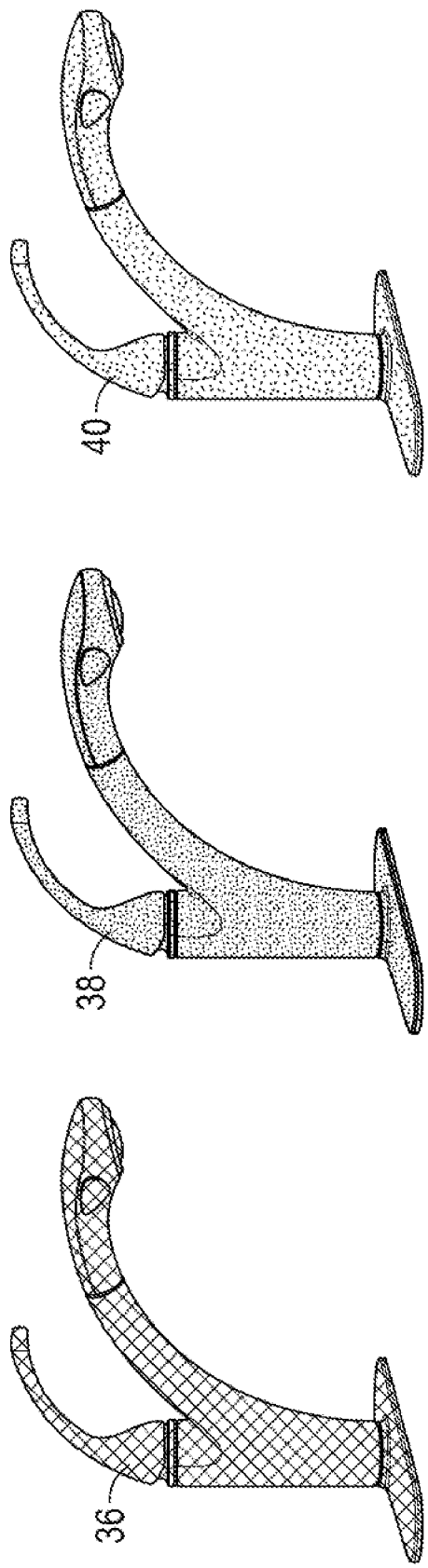
FIGS. 3A-3C illustrates three example products that are variants of one another, in embodiments.

Accordingly, example products shown in FIGS. 3A-3C may be variants of one another, and therefore part of the same product family. Such a product family may be identified according to the methods described herein. In particular, the three faucets 36, 38, and 40 shown in FIGS. 3A-3C, respectively, are variants of one another because they share many identical or very similar properties, but with a relatively few differences. The faucets 36, 38, and 40 are each Forte™ Single-Handle Pull-Out Sprayer Kitchen Faucets, but each have a different finish. Accordingly, if a user is looking for a faucet, it is advantageous to display on a product webpage for Forte™ Single-Handle Pull-Out Sprayer Kitchen Faucets information about all three variants in the product family. In this way, the user may view information about each different finish for the faucets 36, 38, and 40 on a single product page. Similarly, if a user is searching for faucets, a webpage displaying search results may display a product family as a single result instead of showing all variants of an identified product family as separate results. As discussed herein, this helps users find alternative products easily and without the hassle of searching or browsing through a massive product catalog. Displaying variants also saves consumers time in comparing alternative products by ensuring that key product features remain the same across product variants.

FIG. 4 shows a non-limiting example of how product variant options may be shown to the user on a webpage (e.g., a product detail webpage, a search results webpage). FIG. 4 specifically shows the faucet 36 of FIG. 3A, which is a Forte™ Single-Handle Pull-Out Sprayer Kitchen Faucet with a Vibrant Brushed Nickel finish. In the example of FIG. 4, the faucet 36 is part of a product family that has five (5) different finishes, but otherwise similar characteristics. The boxes 42 and 44 preview the different color options available, and are selectable by a user to change the display where the faucet 36 is currently shown in FIG. 4. For example, if one of the boxes 42 is selected by the user that corresponds to the faucet 38 of FIG. 3B, the faucet 38 would be displayed in place of the faucet 36 so the user can see what the faucet 38 with a Brushed Chrome finish looks like. A status indicator 46 can indicate which of the boxes 42 or 44 is currently selected. In the example of FIG. 4, the box 44 is currently selected. The various display elements of FIG. 4 may include additional, different, or fewer display elements than what is shown in FIG. 4. In addition, the display elements relevant to a product family and its variants (e.g., as shown in FIG. 4) may be displayed as part of different webpages, such as on a product detail webpage or as part of a search results webpage. Thus, the boxes 42 and 44 represent user interface elements associated with product variants of a product family, where the user interface elements are selectable by a user of the webpage to change a portion of the webpage for viewing the different product variants on a single webpage.

Figure 5:
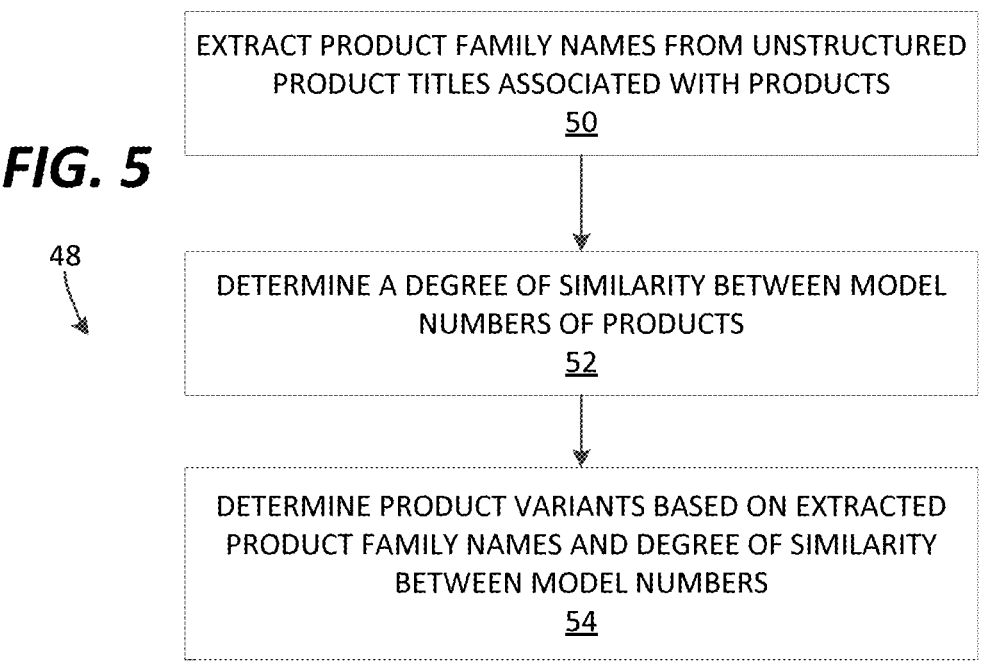
FIG. 5 is a flow chart illustrating an example method of identifying product variants, in embodiments.

FIG. 5 is a flow chart illustrating an embodiment of a method 48 for using a query rewrite model to build a lookup table. The method 48 may find use as the first step 22 in the method 10 of FIG. 1, in an embodiment.

The method 48 may first include a step 50 that includes extracting a product family name from unstructured product titles associated with different products. The unstructured product titles may be basic text. As described herein, the extracted product family names may be used to determine products that are variants of one another for display together on a webpage (e.g., products may be variants of one another if they have the same or a similar extracted product family name). The extracted product family names may be stored in the lookup tables 30 and/or the product information database 14 of FIG. 2, for example, along with the information about the respective products from which each product family name was extracted.

The extraction of product family names may utilize different algorithms, natural language processing (NLP), or other mechanisms for extracting information from basic or unstructured text. The various processing done as part of the extraction is designed such that the family name is of a sequence of important tokens (e.g., words) from a product title that should be found in all products within a product variant family. Thus, the product family name also represents a title for a group of product variants. For example, the faucets of FIGS. 3A-3C may be represented by a family name of Forte™ Single-Handle Pull-Out Sprayer Kitchen, as demonstrated in FIG. 6, in which the phrase "Faucet In Vibrant Brushed Nickel" of product title 56 may be removed and "Faucet In Polished Chrome" of product title 58 may be removed to yield a common product family name for the faucets 36 and 40. In other words, the faucets 36 and 40 may be considered to be product variants because they have the same extracted product family name.

In particular, the extraction of product family names may include one or more of the following language processing steps: (1) standardizing terms in unstructured product titles with a synonyms dictionary, (2) removing punctuation or other non-standard characters from unstructured product titles, (3) removing numbers or units of measurement from unstructured product titles, (4) removing brand name text from unstructured product titles, (5) removing brand name text from unstructured product titles where the brand name text is not consistently part of unstructured product titles for products known to be of a particular brand, (6) removing words from unstructured product titles that are on a manually created blacklist of words, (7) removing words that are different from one or more other unstructured product titles, (8) removing words that are the same as words in a product category description associated with a given product of the plurality of products (e.g., a product category description as indicated in the product information database 14 of FIG. 2), or (9) removing words relating to product variant attributes (e.g., related to color, finish, pack size, size, material type, weight). For example, in FIG. 6, words related to a variant attribute, product finish (e.g., Vibrant Brushed Nickel, Polished Chrome), are removed from the product names to yield the product family name. Similarly, the word "In" is removed from the product names as a word that may appear on a manually created blacklist of words. The word "Faucet" is also removed in FIG. 6, which may be an example of removing a word that relates to a product category description associated with a given product. In other words, if the product is already otherwise characterized as a faucet in structured data relating to the product, that word may be removed from an unstructured product title for determining a product family name.

The method 48 may further include a step 52 that includes determining a degree of similarity between model numbers of the plurality of products. If the degree of similarity between model numbers of products is above a predetermined threshold, those products may be considered as being in the same family. As described herein, the degree of similarity between model numbers of products may be used to determine products that are variants of one another for display together on a webpage (e.g., products may be variants of one another if they have the same or a similar extracted product family name). Information about the processing of the model numbers, such as an edit distance score between product model numbers as described further below, may be stored in the lookup tables 30 and/or the product information database 14 of FIG. 2, for example, along with the model numbers of the products themselves.

Since products that are variants or one another may be assigned similar model numbers by a manufacturer, those model numbers may be analyzed for a degree of similarity to identify product variants. For example, in products that are variants of one another, a majority of the model number may similar or the same (e.g., constant) for product variants of a product family, while a few characters of model numbers may change or be added to represent the available attributes that differ between product variants. In FIG. 7, the faucets 36 and 40 of FIGS. 3A and 3C are again shown, as well as their respective model numbers 60 and 62. A finish of the faucets 36 and 40 are represented by the two final letters in the model numbers 60 and 62. All other characters in the model numbers 60 and 62 are the same/constant. In addition, the portion of the model numbers 60 and 62 that differ from one another (e.g., "BN" of the model number 60, "CP" of the model number 62) correspond to the product variant type (e.g., finish) and product variant property (e.g., "Vibrant Brushed Nickel" for the faucet 36, "Polished Chrome" for the faucet 40). In addition, the product variant property (e.g., "Vibrant Brushed Nickel" for the faucet 36, "Polished Chrome" for the faucet 40) also corresponds to different portions of the unstructured product titles 56 and 58 that were removed in an extraction step for determining the product family name (e.g., the step 50 of FIG. 5).

Different ways of determining the degree of similarity between model numbers may be used. For example, fourteen (14) out of sixteen (16) (or approximately 88%) of the non-space characters of the model numbers 60 and 62 are the same. If a predetermined threshold for a degree of similarity is set, for example, at 75%, the model numbers 60 and 62 may be considered to be of a threshold that indicates the products are variants of one another (e.g., part of the same product family).

Other methods of determining a degree of similarity between two model numbers may also be used. For example, methods that determine a similarity between two different character strings based on how many insertions, deletions, and/or substitutions must be made to make the character strings match may be used. Examples of such methods include calculating an edit distance, Levinshtein distance, and/or Hamming distance. In calculating an edit distance or similar, a lower score may indicate a higher degree of similarity between two different character strings, because the distance score represents a smaller distance or difference between the character strings.

Figure 8:
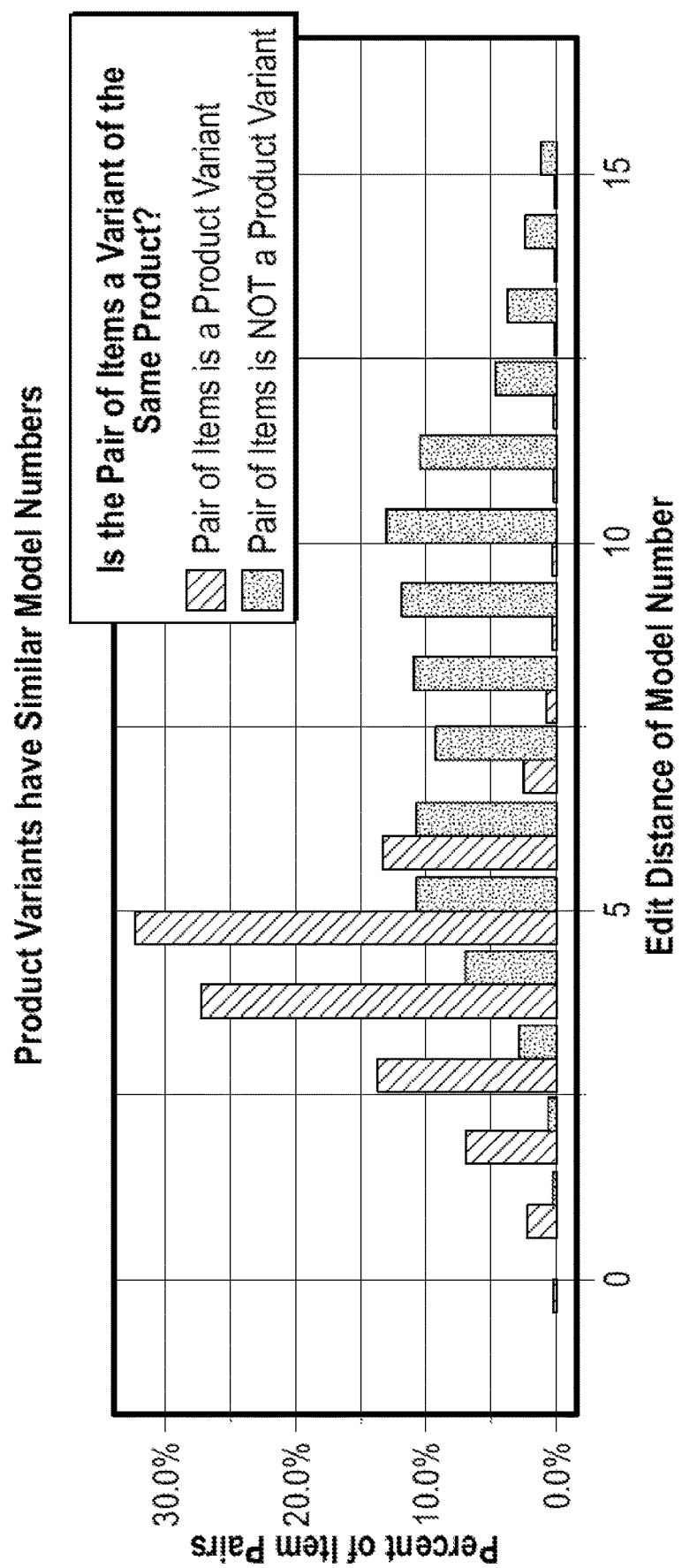
FIG. 8 is a graph illustrating how edit distance of model numbers between product pairs of an example product set correlates with products of each product pair being variants of one another, in embodiments.

In an example embodiment, the number of insertions, deletions, and/or substitutions needed to get two different character strings to match are given equal weight for calculating an edit distance. However, in various embodiments, those weights may be varied. An edit distance of a product set of a large national retailer was performed. The product set had known product variant relationships, so that the calculated edit distances could be tested for accuracy. In other words, the edit distance scores that were calculated were compared to known product variant information to determine whether edit distance scores could be used to identify product variants. FIG. 8 shows the results of this comparison and the edit distance scores.

In particular, FIG. 8 demonstrates that for edit distance scores of five (5) or less as calculated to quantify the distance between model numbers of pairs of products, those product pairs are likely to be in the same product family, and that for product pairs with an edit distance score of higher than five (5), the product pair is unlikely to be in the same product family. As such, a comparison of model number similarity may be used to determine product variants. Where edit distance scores are used, such as those shown in FIG. 8, a determination that the degree of similarity between model numbers of two products is above a predetermined threshold may actually include determining that the edit distance score between the two products is less than a predetermined threshold (e.g., less than five (5) in the example of FIG. 8). FIG. 8 represents a non-limiting example of different edit distance scores, and different methods for calculating a degree of similarity between product model numbers may be used, and different product sets that yield different results than those shown in FIG. 8 may also be used in various embodiments.

Because formats for model numbers may vary by manufacturer of a product or even among product lines of the same manufacturer by product type, a threshold for determining similarity between model numbers may be varied based on one or more different characteristics of a product (e.g., manufacturer, product type). Product type or manufacturer information may be stored, for example, in the product information database 14 of FIG. 2. As just one non-limiting example, a predetermined threshold for similarity of model numbers for products manufactured by Company A may be set at a first level while a predetermined threshold for similarity of model numbers for products manufactured by Company B may be set at a second level.

The method 22 may further include a step 54 that includes determining product variants based on the extracted product family names (e.g., as calculated in step 50 of FIG. 5) and the determined degree of similarity between model numbers (e.g., as calculated in step 52 of FIG. 5). As described herein, two products may be considered to be variants of one another if they have the same extracted product family name. During extraction of the product family name, various processing is done during extraction that results in a product family name that differs from an unstructured product name (e.g., removing words, normalizing synonyms, etc.). As such, the methods for extracting a product family name and comparing it to other extracted product family names for identical matches could also be characterized as determining a degree of similarity between the unstructured product names of two products. Thus, in various embodiments, the unstructured product names themselves could be compared to determine candidates for product families based on a degree of similarity between unstructured product names, rather than extracting product family names and then comparing the product family names. In such examples, a degree of similarity between the unstructured product names may be determined (e.g., by calculating edit distance scores between product names), and that degree of similarity can be compared to a predetermined threshold to determine whether products are variants of one another. In another embodiment where extracted product family names are compared, a degree of similarity and a predetermined threshold may also be used instead of comparing extracted product family names for exact matches. Similarly, in some embodiments, a base model number may be extracted from raw model numbers, and the base model numbers may be compared for exact matches instead of calculating a degree of similarity between model numbers.

In various embodiments, product families may be determined using both of steps 50 and 52, or product families may be determined by using only one of the steps 50 or 52 individually. In addition, if both of the steps 50 and 52 are used, the steps may be performed in any order. In such an example, products may be considered variants of one another only if the extracted product family names as determined in the step 50 are the same and if the degree of similarity between the model numbers of products as determined in the step 52 is above a predetermined threshold. In some embodiments, whichever step of the steps 50 or 52 is performed first may be used to reduce the amount of processing required for the latter step. For example, if the step 50 is performed first and there are products that do not have a product family name that matches any other product, those products may be exclude from any model number processing done as a part of the step 52. For example, the edit distance score may be calculated only for products that are determined to have the same extracted product family name as at least one other product. Similarly, if the step 52 is performed first and there are products that do not have a degree of similarity between their respective model numbers that is above a predetermined threshold, those products may be exclude from any product family name extraction done as a part of the step 50. For example, the product family name may be extracted only for products that are determined to have an edit distance score that is below a predetermined threshold with respect to at least one other product.

Equations 1 and 2 below, as well as their accompanying description, describe non-limiting embodiments for identifying product variants (e.g., according to the step 54 of FIG. 5). First, identifying product variants may use the extracted product family names as extracted at the step 50. For each product family (e.g., variant group), referred to as a cluster Cl, a first object $O_i$ and a second object $O_k$, where $O_i$, $O_k \in$ Cl, must have the exact same attribute $A_j$, where the attribute $A_j$ is the product family name. This relationship is represented below by Equation 1.

$$O_i[A_j]=O_k[A_j] \qquad \text{Equation 1}$$

Second, the model number for each product may be compared to determine whether products may be variants of one another. In other words, for two products to be considered part of the same product family, the model numbers have at minimum degree of similarity of another product in the product family. This may be represented by Equation 2 below, where for each cluster Cl:

$$\min_{O_k \in Cl} d(O_i[A_j], O_k[A_j]) \leq c : \qquad \text{Equation 2}$$

for all $O_i \in$ Cl, where $A_j$ is the model number attribute, d is the edit distance between the $O_i$ and $O_k$ model numbers, and where c is a numerical constant (e.g., the predetermined threshold for similarity).

A product variant type may also be automatically determined for product families in various embodiments. For example, the system may know that certain words may correspond to certain product variant types—color names (e.g., green, purple, blue) may relate to a color product variant type, finish names (e.g., polished, brushed) may relate to a finish product variant type, size indicators (e.g., large, medium, two by four inches) may relate to a size product variant type, weight indicators (e.g., pounds, kgs., lbs., grams) may relate to a weight product variant type, count indicators (e.g., count, ct., count, pack of) may relate to a pack size product variant type, etc. Accordingly, if those words or abbreviations of words that indicate a product variant type are found in unstructured product titles and/or model numbers of products, the system may determine the product variant type(s) applicable to a product family. Such a determined product variant type may be stored in a lookup table or database along with other product information, including product family/variant information.

In addition to determining a product variant type, a product variant property related to the determined product variant type may also be determined. For example, for the faucets 36, 38, and 40 shown in FIGS. 3A-3C, a product variant type of "finish" may be determined. The text of the unstructured product title and/or the text of the model number may be further processed by the system to determine the finish, or product variant property, of each of the faucets 36, 38, and 40. For example, for the faucet 36 the product variant property may be determined to be Vibrant Brushed Nickel, for the faucet 38 the product variant property may be determined to be Brushed Chrome, and for the faucet 40 the product variant property may be determined to be Polished Chrome. For a product family, a determined product variant property should be different for each product in the product family.

In various embodiments, other steps than those of the method 48 of FIG. 5 may be additionally or alternatively used for identifying product variants. For example, a brand name, either extracted from an unstructured product title or stored as a separate category of data for a product (e.g., in the product information database 14 of FIG. 2), may be determined for each product analyzed. A product may not be considered to be a variant of another product unless the two products are of the same brand. In other words, for products to be included in the same family, the products should be of the same brand. Other product information categories may be used in a similar manner. For example, product type, product category, product price, etc. may be compared to factor into whether products are variants of one another. Such information may also be stored in the product information database of FIG. 2, in embodiments.

As a non-limiting example, an Algorithm 1 below shows one way of identifying product variants using various steps described herein:

---

Algorithm 1 Finding Product Variants

Input: Products $p_i, p_j \in \mathcal{P}$,
P the set of n products.
$p_i$ [brand] the brand of product $p_i$
$p_i$ .[category] the category for product $p_i$
h(p,[title]) the product family name for $p_i$ . extracted from the product title
d($p_i$ [model number],$p_j$ [model number]) the Levenstein distance between the model numbers for products $p_i$ and $p_j$
$c_i$ the cutoff for how far apart model numbers may be for all products of the same product type as A
Output: A set of product variants:
{$p_i$ : $p_j$ are all variants of the same product}
1. Check that $p_i$ i[brand]= $p_j$ [brand]
2: Check that $p_i$ [category]= $p_j$ [category]
3: Check that h($p_i$ [title]) = h($p_j$ [title]
4: Check that d($p_i$ [model number], phd j [model number]) ≤ $c_i$
5: return Are $p_i$ and $p_j$ i product variants?

---

Algorithm 1 demonstrates that for products $p_i$ and $p_j$ that are part of a set of n products, the following conditions are determined in order to consider that the two products $p_i$ and $p_j$ are variants of one another (e.g., in the same product family): (1) a brand of the products $p_i$ and $p_j$ is the same, (2) a category of the products $p_i$ and $p_j$ is the same, (3) an extracted title of the products $p_i$ and $p_j$ is the same, and (4) that the model numbers of the products $p_i$ and $p_j$ have an edit distance within a predetermined threshold.

In a test, the method 48 of FIG. 5 described above (e.g., using extracted product family name and degree of similarity of model number) was measured against a method of using only model number edit distances to determine product variants to determine the effectiveness of the method 48. In addition, the method 48 was measured against a classification based approach that compares a set list of product attributes against one another to attempt to determine products that have mostly similar products features. For example, product features such as weight, length, width, depth, and price may be compared in a classification based approach to attempt to determine product variants. Each of the method 48, the model number analysis only method, and the classification based method were applied to the same set of products of a product catalog of a large retailer with a wide variety of product categories such as window treatments, faucets, PVC pipes, tools, hardwood flooring, and many other products. Overall, the product set had about one million distinct products. The results of each method were compared for the products that were already known to be variants of one another (e.g., by way of manual entry of product variant information). True positives occurred when a given method grouped together items that are known to be variants of one another. False positives occur when a given method groups together items that are known to be variants of different products. Products with no known variant information were ignored in the validation process performed. Recall was measured by looking at items with known product variant groupings, and determining how many of these items were correctly identified by a given method. The performance of each method is shown below in Table 1:

TABLE 1

| Model | Precision | Recall | F1 Score | Percent of Highly Accurate Categories |
|---|---|---|---|---|
| Classification Baseline | 64% | 33% | 0.44 | 35.7% |
| Model Number Only | 32% | 6% | 0.10 | 23.3% |
| Cleaned Title and Model Number | 62% | 92% | 0.74 | 51.3% |

Accordingly, the method using model number only performed poorly, but the method 48 performed much better. In addition to overall precision and recall, the method 48 had high accuracy (considered to be for this analysis greater than or equal to 90% accuracy) for determining product variants in 51.3% of product categories of the product set, far higher than the other methods compared in Table 1. Measuring accuracy on a product category basis may be valuable. For example, the systems and methods described herein may be implemented only for product categories for which the tested methods are highly accurate. Furthermore, certain categories of products may be more likely than others to have products that are categorizable by family/variant. As such, it may not be useful to apply a product variant identification method to a category of products that does not naturally lend itself to product variant/family organization.

Accordingly, the embodiments described herein may be used for identifying product variants and grouping those variants into product families. Advantageously, the embodiments herein may be used across a diverse catalog of different product types. By using product titles and model numbers, which are often assigned by a manufacturer, information encoded in those fields may be decoded and used for product family grouping. For example, products that are variants of one another are likely to have similar product titles and/or model numbers because a manufacturer is likely to assign similar product titles and/or model numbers to similar products. In this way, a desirable constraint for identifying product variants, only considering similar products (e.g., products of the same category) to be candidates for being variants of one another, is embedded into the methods and systems described herein.

Figure 9:
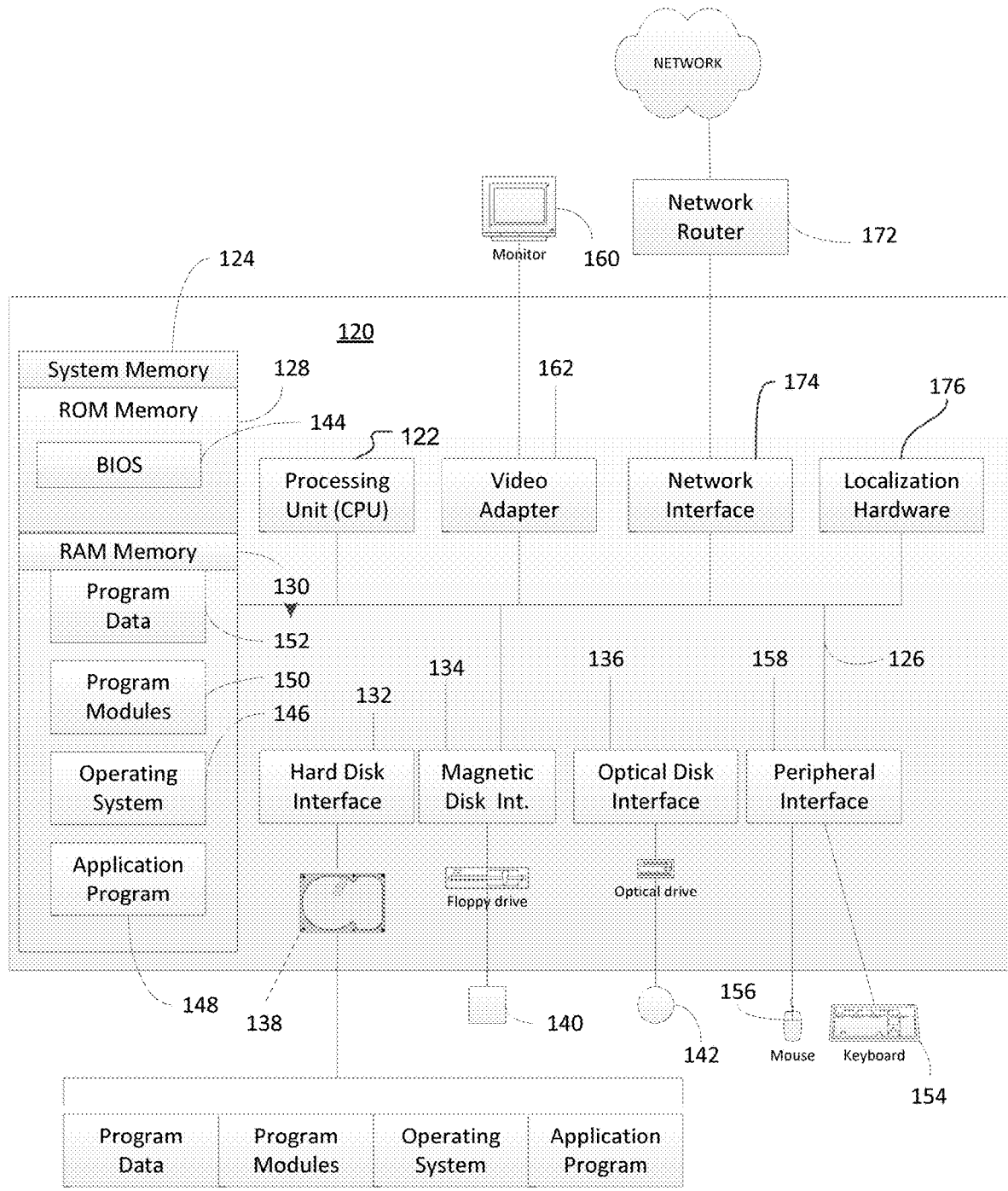
FIG. 9 is a diagrammatic view of an example user computing environment, according to some embodiments.

FIG. 9 is a diagrammatic view of an illustrative computing system that includes a general purpose computing system environment 120, such as a desktop computer, laptop, smartphone, tablet, or any other such device having the ability to execute instructions, such as those stored within a non-transient, computer-readable medium. Furthermore, while described and illustrated in the context of a single computing system 120, those skilled in the art will also appreciate that the various tasks described hereinafter may be practiced in a distributed environment having multiple computing systems 120 linked via a local or wide-area network in which the executable instructions may be associated with and/or executed by one or more of multiple computing systems 120.

In its most basic configuration, computing system environment 120 typically includes at least one processing unit 122 and at least one memory 124, which may be linked via a bus 126. Depending on the exact configuration and type of computing system environment, memory 124 may be volatile (such as RAM 130), non-volatile (such as ROM 128, flash memory, etc.) or some combination of the two. Computing system environment 120 may have additional features and/or functionality. For example, computing system environment 120 may also include additional storage (removable and/or non-removable) including, but not limited to, magnetic or optical disks, tape drives and/or flash drives. Such additional memory devices may be made accessible to the computing system environment 120 by means of, for example, a hard disk drive interface 132, a magnetic disk drive interface 134, and/or an optical disk drive interface 136. As will be understood, these devices, which would be linked to the system bus 126, respectively, allow for reading from and writing to a hard disk 138, reading from or writing to a removable magnetic disk 140, and/or for reading from or writing to a removable optical disk 142, such as a CD/DVD ROM or other optical media. The drive interfaces and their associated computer-readable media allow for the nonvolatile storage of computer readable instructions, data structures, program modules and other data for the computing system environment 120. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 120.

A number of program modules may be stored in one or more of the memory/media devices. For example, a basic input/output system (BIOS) 144, containing the basic routines that help to transfer information between elements within the computing system environment 120, such as during start-up, may be stored in ROM 128. Similarly, RAM 130, hard drive 138, and/or peripheral memory devices may be used to store computer executable instructions comprising an operating system 146, one or more applications programs 148 (such as a Web browser, retailer's mobile app, retailer's point-of-sale checkout and ordering program, and/or other applications that execute the methods and processes of this disclosure), other program modules 150, and/or program data 152. Still further, computer-executable instructions may be downloaded to the computing environment 120 as needed, for example, via a network connection.

An end-user, e.g., a customer, retail associate, and the like, may enter commands and information into the computing system environment 120 through input devices such as a keyboard 154 and/or a pointing device 156. While not illustrated, other input devices may include a microphone, a joystick, a game pad, a scanner, etc. These and other input devices would typically be connected to the processing unit 122 by means of a peripheral interface 158 which, in turn, would be coupled to bus 126. Input devices may be directly or indirectly connected to processor 122 via interfaces such as, for example, a parallel port, game port, firewire, or a universal serial bus (USB). To view information from the computing system environment 120, a monitor 160 or other type of display device may also be connected to bus 26 via an interface, such as via video adapter 162. In addition to the monitor 160, the computing system environment 120 may also include other peripheral output devices, not shown, such as speakers and printers.

The computing system environment 120 may also utilize logical connections to one or more computing system environments. Communications between the computing system environment 120 and the remote computing system environment may be exchanged via a further processing device, such a network router 172, that is responsible for network routing. Communications with the network router 172 may be performed via a network interface component 174. Thus, within such a networked environment, e.g., the Internet, World Wide Web, LAN, or other like type of wired or wireless network, it will be appreciated that program modules depicted relative to the computing system environment 120, or portions thereof, may be stored in the memory storage device(s) of the computing system environment 120.

The computing system environment 120 may also include localization hardware 176 for determining a location of the computing system environment 120. In embodiments, the localization hardware 176 may include, for example only, a GPS antenna, an RFID chip or reader, a WiFi antenna, or other computing hardware that may be used to capture or transmit signals that may be used to determine the location of the computing system environment 120.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A computer-implemented method, comprising:
   extracting, by one or more processors of one or more computing devices, a product family name from each of a plurality of unstructured product titles associated with a plurality of products;
   determining, by the one or more processors, a degree of similarity between model numbers of the plurality of products, wherein the determining the degree of similarity between the model numbers of the plurality of products comprises:
      calculating an edit distance score between the model numbers of the plurality of products; and
      determining that the edit distance score between the model numbers of the plurality of products is less than a first predetermined threshold, wherein the first predetermined threshold is determined based at least in part on a manufacturer or product type of the plurality of products;
   determining, by the one or more processors, that at least two of the plurality of products are variants of one another by:
      determining that the at least two of the plurality of products have a same extracted product family name; and
      determining that the degree of similarity between the model numbers of the plurality of products is above a second predetermined threshold;
   receiving, by the one or more processors, a user query associated with one of the at least two of the plurality of products; and
   populating, in response to the user query associated with the one of the at least two of the plurality of products, a single webpage of a website with data indicative of the at least two of the plurality of products that are determined to be the variants of one another.

2. The computer-implemented method of claim 1, further comprising determining, by the one or more processors, a product variant type between the at least two of the plurality of products.

3. The computer-implemented method of claim 2, wherein the product variant type is at least one of product color, product finish, product pack size, product size, material type, or weight.

4. The computer-implemented method of claim 1, further comprising displaying, by the one or more processors as part of the website, the at least two of the plurality of products that are determined to be variants of one another on the single webpage of the website.

5. The computer-implemented method of claim 4, wherein:
   the single webpage comprises a first user interface element associated with a first product of the at least two of the plurality of products,
   the single webpage comprises a second user interface element associated with a second product of the at least two of the plurality of products, and
   each of the first and second user interface elements are selectable by a user of the single webpage to change a portion of the single webpage for viewing the at least two of the plurality of products that are determined to be variants of one another on the single webpage.

6. The computer-implemented method of claim 1, wherein the determining that at least two of the plurality of products are variants of one another further comprises determining that the at least two of the plurality of products have a same brand name.

7. The computer-implemented method of claim 1, wherein the determining that at least two of the plurality of products are variants of one another further comprises determining that the at least two of the plurality of products have a same product category.

8. The computer-implemented method of claim 1, wherein the edit distance score is calculated only for those of the plurality of products that are determined to have the same extracted product family name.

9. The computer implemented method of claim 1, wherein the extracted product family name for a product of the plurality of products represents a portion of an unstructured product title for the product.

10. A non-transitory computer-readable medium having computer executable instructions stored thereon that, upon execution by a processing device, cause the processing device to perform operations comprising:
   extracting a product family name from each of a plurality of unstructured product titles associated with a plurality of products;
   determining a degree of similarity between model numbers of the plurality of products;
   determining that at least two of the plurality of products are variants of one another by:
      determining that the at least two of the plurality of products have a same extracted product family name; and
      determining that the degree of similarity between the model numbers of the plurality of products is above a predetermined threshold, wherein the predetermined threshold is determined based at least in part on a manufacturer or product type of the plurality of products;
   receiving a user query associated with one of the at least two of the plurality of products;
   populating, in response to the user query associated with the one of the at least two of the plurality of products, a single webpage of a website with data indicative of the at least two of the plurality of products that are determined to be the variants of one another; and
   displaying the at least two of the plurality of products that are determined to be variants of one another on the single webpage of the website.

11. The non-transitory computer readable medium of claim 10, wherein the instructions further cause the processing device to perform operations comprising determining a product variant type between the at least two of the plurality of products.

12. The non-transitory computer readable medium of claim 11, wherein the instructions further cause the processing device to perform operations comprising determining a product variant property related to the determined product variant type, wherein the product variant property is different for the at least two of the plurality of products that are determined to be variants of one another.

13. The non-transitory computer readable medium of claim 12, wherein the product variant property comprises:
   a color of a product when the determined product variant type is product color,
   a finish of the product when the determined product variant type is product finish, a pack size of the product when the determined product variant type is product pack size, a size of the product when the determined product variant type is product size, a material type of the product when the determined product variant type is material type, or a weight of the product when the determined product variant type is weight.

14. The non-transitory computer readable medium of claim 10, wherein the extracted product family name for a product of the plurality of products represents a portion of an unstructured product title for the product.

15. The non-transitory computer readable medium of claim 10, wherein the plurality of unstructured product titles comprises basic text.

16. The non-transitory computer readable medium of claim 10, wherein the extracting the product family name from each of the plurality of unstructured product titles associated with the plurality of products comprises at least one of:

standardizing terms in the plurality of unstructured product titles with a synonyms dictionary, removing punctuation or other non-standard characters from the plurality of unstructured product titles, or removing numbers or units of measurement from the plurality of unstructured product titles.

17. The non-transitory computer readable medium of claim 10, wherein the extracting the product family name from each of the plurality of unstructured product titles associated with the plurality of products comprises removing words from a manually created blacklist of words.

18. The non-transitory computer readable medium of claim 10, wherein the extracting the product family name from each of the plurality of unstructured product titles associated with the plurality of products comprises removing words that are the same as words in a product category description associated with a given product of the plurality of products.

19. The non-transitory computer readable medium of claim 10, wherein the extracting the product family name from each of the plurality of unstructured product titles associated with the plurality of products comprises removing words relating to product variant attributes.

20. The non-transitory computer readable medium of claim 10, wherein the predetermined threshold is determined based at least in part on the manufacturer of the plurality of products, wherein a first predetermined threshold is used with products associated with a first manufacturer and a second predetermined threshold is used with products associated with a second manufacturer.

21. A non-transitory computer-readable medium having computer executable instructions stored thereon that, upon execution by a processing device, cause the processing device to perform operations comprising:

extracting a product family name from each of a plurality of unstructured product titles associated with a plurality of products, wherein the extracting the product family name from each of the plurality of unstructured product titles associated with the plurality of products comprises removing words that are the same as words in a product category description associated with a given product of the plurality of products;

determining a degree of similarity between model numbers of the plurality of products;

determining that at least two of the plurality of products are variants of one another by:

determining that the at least two of the plurality of products have a same extracted product family name; and determining that the degree of similarity between the model numbers of the plurality of products is above a predetermined threshold, wherein the predetermined threshold is determined based at least in part on a manufacturer or product type of the plurality of products;

receiving, by the one or more processors, a user query associated with one of the at least two of the plurality of products; and populating, in response to the user query associated with the one of the at least two of the plurality of products, a single webpage of a website with data indicative of the at least two of the plurality of products that are determined to be the variants of one another.

* * * * *